United States Patent
Karlsson

(10) Patent No.: US 7,321,558 B2
(45) Date of Patent: Jan. 22, 2008

(54) METHOD AND APPARATUS IN A COMPUTER NETWORK

(76) Inventor: Gunnar Karlsson, Ruddammsbacken 42, SE-114 21 Stockholm (SE)

( * ) Notice: Subject to any disclaimer, the term of this patent is extended or adjusted under 35 U.S.C. 154(b) by 998 days.

(21) Appl. No.: 10/181,448

(22) PCT Filed: Jan. 19, 2001

(86) PCT No.: PCT/SE01/00095

§ 371 (c)(1),
(2), (4) Date: Sep. 5, 2002

(87) PCT Pub. No.: WO01/54449

PCT Pub. Date: Jul. 26, 2001

(65) Prior Publication Data

US 2003/0076561 A1    Apr. 24, 2003

(30) Foreign Application Priority Data

Jan. 21, 2000   (SE)  ..................... 0000176

(51) Int. Cl.
*H04J 3/04* (2006.01)
(52) U.S. Cl. ...................... 370/235; 370/539
(58) Field of Classification Search .................. None
See application file for complete search history.

(56) References Cited

U.S. PATENT DOCUMENTS

| | | | |
|---|---|---|---|
| 4,787,692 A * | 11/1988 | Spanke | 385/17 |
| 4,876,681 A | 10/1989 | Hagiwara et al. | |
| 4,894,818 A * | 1/1990 | Fujioka et al. | 398/51 |
| 4,955,015 A | 9/1990 | Lobjinski et al. | |
| 4,955,017 A | 9/1990 | Eng et al. | |
| 5,197,064 A | 3/1993 | Chao | |
| 5,305,310 A | 4/1994 | Itoh et al. | |
| 5,471,468 A | 11/1995 | Sandin et al. | |
| 5,485,453 A * | 1/1996 | Wahlman et al. | 370/389 |
| 5,513,210 A * | 4/1996 | Vook et al. | 375/133 |
| 5,774,698 A * | 6/1998 | Olnowich | 370/366 |
| 5,825,517 A | 10/1998 | Antoniades et al. | |
| 6,041,050 A * | 3/2000 | Sanders | 370/352 |
| 6,226,683 B1 * | 5/2001 | Olnowich et al. | 709/238 |
| 6,542,268 B1 * | 4/2003 | Rotolo et al. | 370/228 |

FOREIGN PATENT DOCUMENTS

GB    2 279 538    4/1995

OTHER PUBLICATIONS

Sharrok, SM et al., "Efficient CSMA/CD-based protocols for multiple priority classes". Computers, IEEE Transactions on vol. 38 Jul. 1989, pp. 943 to 954.

* cited by examiner

*Primary Examiner*—Anh-Vu H. Ly
(74) *Attorney, Agent, or Firm*—Buchanan Ingersoll & Rooney PC

(57) ABSTRACT

A method and the corresponding apparatus for multi-plexing data flows from a number of transmission units. In the method signals are sent from the transmission units and the signals are detected at inputs of a switching unit. Signals, which are detected at a point of time when no other signal is forwarded to an output from the switching unit, are forwarded to said output, whereas signals which are detected at a point of time when another signal is forwarded to said output, are blocked.

14 Claims, 3 Drawing Sheets

METHOD AND APPARATUS IN A COMPUTER NETWORK

FIELD OF THE INVENTION

The present invention generally relates to the handling of data flows in computer and telecommunication networks and, in particular, to a method and apparatuses for multiplexing of data flows.

TECHNICAL BACKGROUND

Traditionally, the traffic in the telecommunication networks has essentially been composed of real time traffic with deterministic and low bandwidth requirements, whereas in computer communication networks, to a considerable degree, it has been composed of non-real time traffic with a bursty and varying need of bandwidth. The different characteristics of the traffic flows have led to different implementations of the networks. The present development on the Internet with multimedia services, new communication services etc. results in new types of traffic flows, which makes new demands on the networks which are to transport and switch these traffic flows.

As regards telecommunication, the extremely fast development of the optical transmission systems, where transmission at Tbit/s was achieved already 1996, has given hopes of providing switched all-optical networks. However, up to now it has turned out that these networks are still limited as regards both the number of nodes that can be passed and the number of simultaneous connections which can be supported. Above all, this is due to coherent crosstalk between wavelength channels, amplifier saturation in the optical amplifiers and intensified spontaneous emission.

These deficiencies imply that networks with optical systems on links which are connected by means of electronic switches are still the most common ones. In this type of network, each link may comprise approximately ten fibres. Each fibre may carry tens of wavelength channels which, in their turn, each can be divided into a large quantity of logical channels. The most common technique for division into logical channels in transport networks is today the synchronous technique SDH (Synchronous Digital Hierarchy) in Europe and SONET (Synchronous Optical NETwork) which is the American correspondence. A disadvantage of these synchronous techniques is that they require clock distribution and synchronisation between the nodes of the network. Another disadvantage is that the distribution of bandwidth between logical channels is essentially static over time.

As regards computer communication, new equipment has been developed based on the network protocol IP (Internet Protocol) on the Internet. Today, IP constitutes the most important technique in networks for handling multimedia traffic, but also the newer technique ATM (Asynchronous Transfer Mode) is used to a certain degree. Both IP and ATM have the advantage of supporting the handling of a large number of traffic flows and of supporting the handling of data streams of different size.

A critical part in the handling of data streams is, of course, the switching or routing in the nodes. This part of the handling consists of two parts, on the one hand, the node must connect the traffic coming through the inputs to the correct output and, on the other hand, the traffic has to be multiplexed on the outputs.

In all-optical switches and in SDH and SONET switches both connection and multiplexing usually occur by means of so-called cross-connect switches which are adjusted in advance on the basis of a dimensioning which implies that contention on the outputs is avoided. This may take place since the bandwidth of the different channels in them are deterministic. Naturally, the disadvantage is that these channels are not suitable as regards traffic which has varying bandwidth requirements.

In IP routers and ATM switches connection and multiplexing may occur in real time. In both these cases, contention for bandwidth on the outputs may appear when packets coming from different inputs at the same point of time are to exit on the same output. This is usually solved by means of buffers and central processing units. However, these solutions require complicated equipment, and problems with the throughput arise at high data transfer rates and a plurality of inputs and outputs.

SUMMARY OF THE INVENTION

The object of the present invention is to eliminate, to some extent, the problem mentioned above in connection with high-speed traffic by enabling handling of the contention between different traffic flows from a number of inputs which are to exit on a fewer number of outputs.

This object according to the invention is achieved by the method and apparatuses according to the invention of the type described by way of introduction being given features which will become evident. Preferred embodiments will also become evident.

According to a first aspect of the invention, a method for multiplexing data flows from a number of transmission units, is provided, comprising the steps of sending signals from the transmission units, detecting signals at the inputs of a switching unit, forwarding signals which are detected at a point of time when no other signal is forwarded to an output from the switching unit to said output, and blocking signals which are detected at a point of time when another signal is forwarded to said output.

According to another aspect of the invention, a method for multiplexing data flows is provided, comprising at least two inputs, at least one output, the number of outputs being fewer than the number of inputs, means for detecting signals on said at least two inputs, means for forwarding signals which are detected at a point of time when no other signal is forwarded to said at least one output from the switching unit to said at least one output, and means for blocking signals which are detected at a point of time when another signal is forwarded to said at least one output.

According to a third aspect of the invention, a method is provided for multiplexing data flows from a number of transmission units on a small number of output channels, comprising a number of switching units, each comprising at least two inputs, at least one output, the number of outputs being fewer than the number of inputs, means for detecting signals on said at least two inputs, means for forwarding signals which are detected at a point of time when no other signal is forwarded to said at least one output from the switching unit to said at least one output, means for blocking signals which are detected at a point of time when another signal is forwarded to said at least one output, means for informing the transmission unit which sent the signal about that signal had been blocked, and means at said at least one output for forwarding signals to an input of another switching unit, said switching units being arranged in a tree structure in a number of levels where said at least one output from each of the switching units in one level is connected to one input of a switching unit in a next level, the number of switching units in the higher level being larger than the number of switching units in the lower level.

By means of the invention, signals from a number of transmission units, which are connected to the inputs of a number of switching units, may be multiplexed by degrees on a small number of outputs from the switching units. One advantage of the invention is that the decisions about which signal is to be forwarded may occur locally in each switching unit. This means that the required equipment becomes less complex, that higher data rates from said transmission units may be allowed. Neither do the signals which are sent need to be synchronised in relation to any universal clock, contain data with the same format nor have the same bit rate. The transmission of the signals may also occur without any synchronisation between the transmission units.

Furthermore, according to the invention, one of two signals which collide will always be forwarded. This means that the throughput may be maintained also at a high incoming traffic in contrast to prior-art technique, such as CSMA/CD, where too high an incoming traffic gives a large number of collisions and, thus, a degradation of the throughput.

Consequently, the invention combines the capacity of synchronous systems to easily and efficiently multiplex data flows at high bit rates with the capacity of asynchronous systems to handle traffic flows, the bit rate of which vary with time. This is carried out by enabling all handling to occur in a distributed and asynchronous manner. No central control is required and no synchronisation between the units.

One embodiment of the invention also comprises the step of the switching unit for each blocked signal informing the transmission unit which sent the signal that the signal has been blocked.

Since the transmission units, the signals of which are blocked, are informed about this, the method allows a simple criterion for retransmission of signals which have been blocked and a possibility of handling giving priority between signals which contain data of different traffic classes.

In one embodiment, the informing step comprises the step of the switching unit for each blocked signal sending an error signal back to the transmission unit that sent the signal.

In an alternative embodiment where the signal is an optical signal, the informing step comprises the step of the switching unit reflecting blocked signals back to the respective transmission unit that sent the signal.

These embodiments provide a simple and decentralised handling of informing the transmission units that a signal which they have sent has been blocked without necessitating the use of complex, centralised monitoring and informing. Especially, in the optical case only an optical reflection of the signal is needed, i.e. no components for generating error signals are required.

In yet another embodiment of the invention, the method further comprises the steps of each transmission unit, the signal of which has been blocked, interrupting the transmission of the blocked signal and of each transmission unit, the signal of which has been blocked, repeating the transmission of the blocked signal after a delay time.

By this method no function for handling the giving of priority to traffic flows needs to be implemented in the switching units. The giving of priority may instead be handled by means of the delay time before repeated transmission is carried out. Subsequently, the delay time may be determined on the basis of the class of the data which the signal contains. In one embodiment, for instance, the transmission of said signal is repeated with 1-persistence for a time slice if it contains traffic of guaranteed class, whereas it is repeated with p-persistence if it contains traffic of best-effort class.

According to yet another embodiment of the invention, the method further comprises the steps of allocating the inputs of the switching units an order of priority and of varying said order of priority over time. Moreover, the forwarding step comprises the step of, if signals are detected at the same point of time on more than one input, forwarding the signal which is detected on the input to which is given the highest priority, to the first output.

This embodiment improves the handling of contention between data flows to the same output since also the cases when signals arrive at the same point of time at a switching unit may be handled.

The method according to the invention may be repeated in several steps, one embodiment of the invention further comprising the step of forwarding signals, which arrive at said output, to an input of another switching unit, the method being repeated for said other switching unit.

According to a preferred embodiment, the number of inputs to and outputs from each switching unit is two and one, respectively. In this embodiment, the switching units may be connected in a tree structure where the number of transmission units are $2^n$, the number of output channels are 1, the number of switching units is $\Sigma_{k=0}^{n-1} 2^k$, the number of levels is n and the number of switching units in one level is twice the number of switching units in the next level.

BRIEF DESCRIPTION OF THE DRAWINGS

The invention will be described in more detail in the following by way of example with reference to the accompanying drawings, in which FIG. 1 schematically shows an example of an apparatus, in which a multiplexing unit according to the invention has been incorporated.

DESCRIPTION OF PREFERRED EMBODIMENTS

Figure 1:
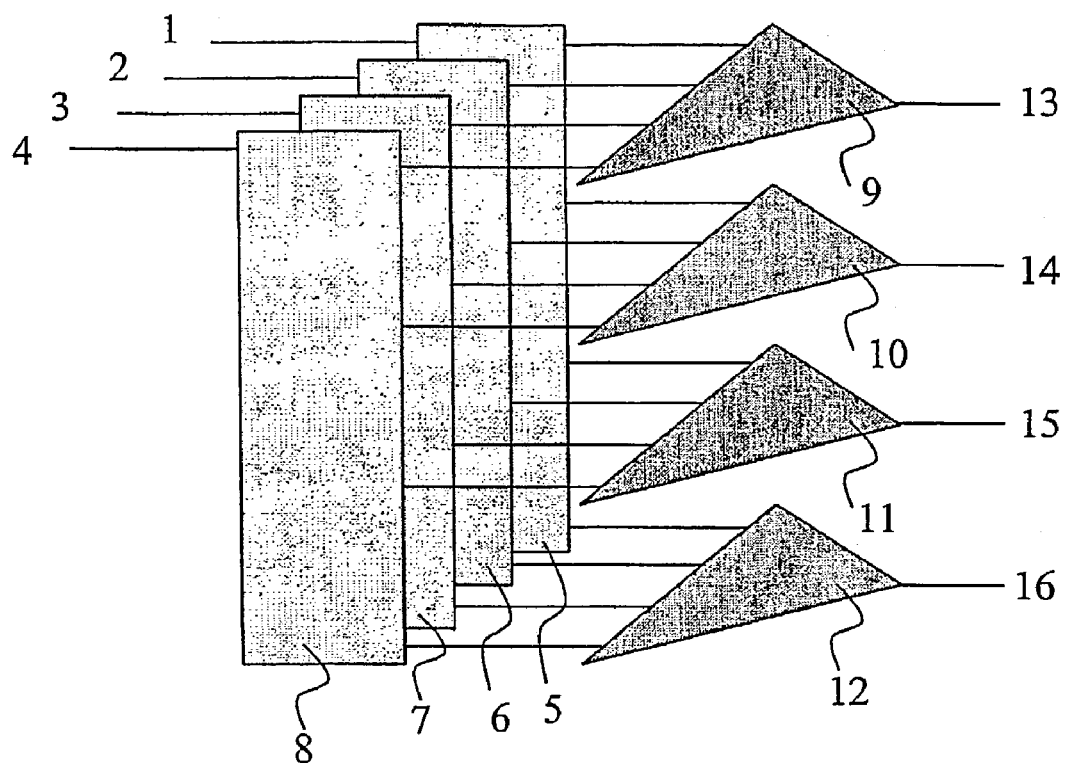

FIG. 1 shows an example of an apparatus, in which the invention may be advantageously used. The apparatus at issue is a switch, for example a switch in a computer network. A number of incoming lines 1-4 are connected to a number of input modules 5-8, each of them being connected to a number of multiplexing units 9-12 according to the invention. The outgoing lines 13-16 then extend from the multiplexing units 9-12. Signals that enter the incoming lines 1-4 of the input modules 5-8 are connected on the basis of address data in the respective signals to the multiplexing units 9-12 which multiplex the signals out on the outgoing lines 13-16. The fact that the number of input units and multiplexing units, respectively, have been chosen to be four only by way of example, should not be seen as a restriction of the invention which very well may comprise both more or less than four of these.

Figure 2:
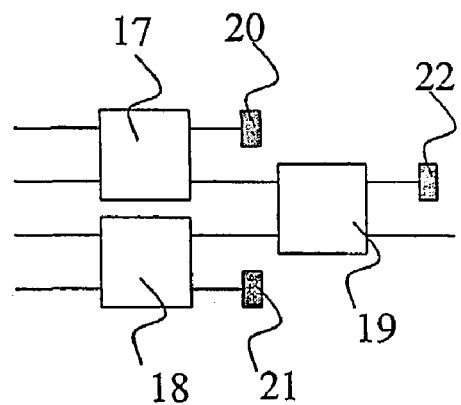
FIG. 2 shows a picture in more detail of one of the multiplexing units in FIG. 1.

FIG. 2 shows a picture in more detail of the multiplexing unit according to the invention. The multiplexing unit in this case comprises three switching units 17-19 which are connected in a tree structure where multiplexing occurs in steps. Each of the switching units 17-19 have two inputs and two outputs and can, for instance, be InP-elements. One output of the respective switching units 17-19 are further connected to a subsequent switching unit, whereas the second output is connected to a means (20-22) in order to inform that a signal has been blocked. In this embodiment the signals are optical signals and the informing means (20-22) are reflectors which reflect the optical signal back on the input from which it came. It should be noted that the number of inputs of a switching unit not necessarily needs to be two, but just as well might be more than two. The only difference in connection with more than two inputs is that a multiplexing which is greater than 2:1 is made in each step in the multiplexing unit. It should also be noted that the number of switching units nor needs to be 3, but the number is determined by the degree of multiplexing in each step and the number of inputs of the multiplexing unit.

Figure 3:
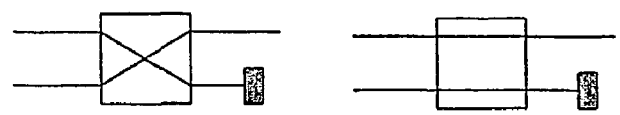
FIG. 3 shows different states of a switching unit according to the invention.

FIG. 3 shows the two states which an embodiment of a switching unit according to the invention may assume. In one state, signals are forwarded on one input to a next switching unit, whereas signals on the second input are forwarded to the reflector. In the second state, the opposite is applicable. The switching occurs with the aid of means (not shown) for forwarding signals on the basis of results from means (not shown) for detecting signals. A description in more detail will be given in the following.

FIGS. 4A-4F show different states in a multiplexing unit according to the invention when using a method according to the invention. The multiplexing unit has three switching units 27-29. A first switching unit 27 with two inputs 30, 31 and two outputs 32, 33, a second switching unit 28 with two inputs 34, 35 and two outputs 36, 37, and a third switching unit 29 with two inputs 38, 39 and two outputs 40, 41. The first output of the first switching unit 27 is connected to a reflector 42 and the second output 33 of the first switching unit 27 is connected to the first input 38 of the third switching unit 29. The first output 36 of the second switching unit 28 is connected to a reflector 43 and the second output 37 of the second switching unit 28 is connected to the second input 39 of the third switching unit 29. The first output 40 of the third switching unit 29 is connected to a reflector 44 and the second output 41 of the third switching unit 29 is further connected out of the multiplexing unit. For the sake of clarity, the reference numerals are shown only in FIG. 4A. However, the same reference numerals apply to the corresponding elements in FIGS. 4B-4F.

Figure 4A:
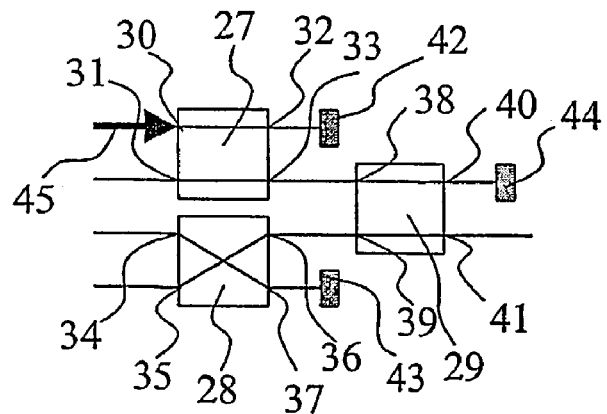
FIGS. 4A-4F show different states in a multiplexing unit according to the invention when using a method according to the invention.

In FIG. 4A a signal 45 is sent through an incoming line to the input 31 of the switching unit 27, this signal 45 being detected with the aid of means for detecting signals (not shown). Since no other signal is forwarded through the switching unit 27 at this point of time, the input 30 is to be connected to the output 33 which is connected to the switching unit 29.

Figure 4B:
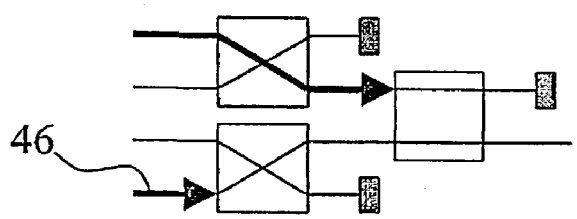

In FIG. 4B this has occurred and the signal 45 has been forwarded through the switching unit 27 to the input 38 of the switching unit 29, where it is detected with the aid of means for detecting signals (not shown). Since no other signal is forwarded through the switching unit 29 at this point of time, the input 38 is to be connected to the output 41. In FIG. 4B also a signal 46 is sent on an incoming line to the input 35 of the switching unit 28, this signal 46 being detected with the aid of means for detecting signals (not shown). Since no other signal is forwarded through the switching unit 28 at this point of time, the input 35 is to be connected to the output 36 which is connected to the switching unit 29.

Figure 4C:
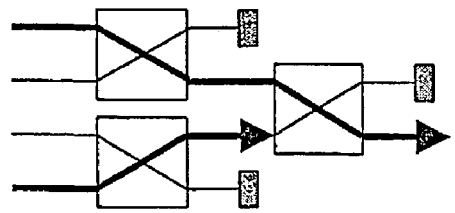

In this case, the input 35 is already connected to the output 36 and in FIG. 4C the signal 46 has been forwarded through the switching unit 28 to the switching unit 29. In FIG. 4C the input 38 has been connected to the output 41 and the signal 45 has been forwarded through the switching unit 29. This results in the input 39, where the signal 46 arrives, not being connected to the output 41, but the signal 46 is instead to be forwarded to the reflector 44.

Figure 4D:
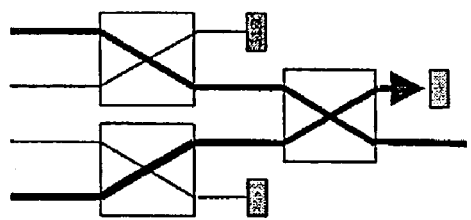
Figure 4E:
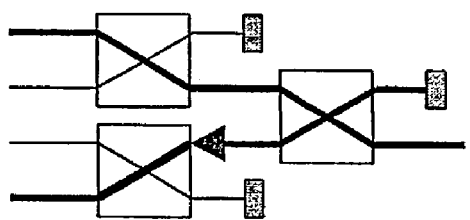
Figure 4F:
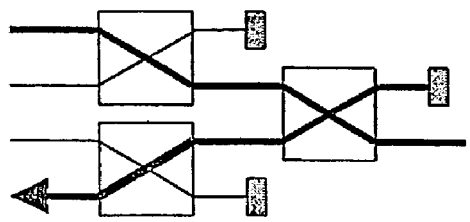

In FIG. 4D the signal 46 has arrived at the reflector 44 and, subsequently, in FIGS. 4E and 4F it has been forwarded back through the switching units 29 and 28, respectively. Since these switching units have been set in connection with the earlier detection of the signal 46, the signal 46 will be forwarded back to the input 35 in which it arrived at the multiplexing unit. Subsequently, the signal is forwarded from the input 35 back on the incoming line, from which it came and back to the sender (not shown) which sent the signal 46.

By this method, a sender which sends a signal into the multiplexing unit can thus, by detecting a reflection of the signal, determine that the signal has been blocked and, then, repeat the transmission of the signal after a latency which can be determined on the basis of the class to which the signal belong, for example guaranteed class or best-effort class. The transmission of the signals occurs without any synchronisation with a clock, but there will always be a minimum time before a retransmission of a signal can be made, the time being given by the time it takes to finish an earlier transmission and prepare a retry. In one embodiment of the invention, a signal with traffic of guaranteed class will repeat the transmission after the minimum time (so-called 1-persistence) until the signal is not blocked, whereas a signal with traffic of best-effort class will repeat the transmission with the probability p after this minimum time (so-called p-persistence). The probability p decreases for each unsuccessful trial until the signal is not blocked and increases again when the transmission is successful. Since signals with traffic of guaranteed class has a more aggressive retransmission strategy when blocking than signals with traffic of best-effort class, signals with traffic of guaranteed class obtain a greater part of the bandwidth out of the multiplexing unit.

It might happen that two signals arrive at the same time at a switching unit. If, for instance, in FIG. 4B a signal arrived at the input 34 of the switching unit 28 at the same time as the signal 46 arrives at the input 35, it would result in contention. However, according to one embodiment of the invention, one input is given priority. In this case, the input 35 is given priority and, thus, it is connected to the output 36. Consequently, the signal 46 would be forwarded and the signal on the input 34 would be reflected via the reflector 43. After a successful transmission of the signal 46, however, the switching unit would change state so that the input 34 is connected to the output 36. In connection with the next transmission, a signal would thus on the input 34 arrive at an input to which has been given priority.

It should be understood that a number of modifications of the embodiments described above are possible within the scope of the invention as defined by the following claims. For example, as mentioned above, the switching units do not need to have exactly two inputs but can have more than two inputs. When multiplexing non-optical signals, such as electric signals, other means for informing a sender that a signal has been blocked may be used than the here present reflectors, such as a means for generating an error signal. Consequently, these error signals are sent in the direction towards the sender in a manner corresponding to the reflected signal in the optical case.

The invention claimed is:

1. A method for multiplexing data flows from a number of transmission units, comprising the steps of:
   sending signals from the transmission units;
   detecting the signals from the transmission units at inputs of a switching unit;
   forwarding the detected signals, which are detected at a point of time when no other signal is forwarded to an output from the switching unit, to said output;
   blocking the detected signals, which are detected at a point of time when another signal is forwarded to said output; and
   for each blocked signal, informing a transmission unit which sent a detected signal that the detected signal has been blocked, said detected signal being an optical signal and the informing step further comprising the step of
   the switching unit reflecting blocked signals back to the respective transmission units that sent the signals.

2. A method as claimed in claim 1, further comprising the steps of
   interrupting the transmission of a blocked signal when the blocked signal is detected at the transmission unit that sent the blocked signal; and
   repeating the transmission of a signal that was blocked after a delay time by each of the transmission units that sent the signal that was blocked.

3. A method as claimed in claim 2, wherein the transmission of said signal is repeated with 1-persistence for a time slice if the signal comprises data of a guaranteed class, whereas it is repeated with p-persistence if it comprises traffic of best-effort class.

4. A method as claimed in claim 1, further comprising the steps of allocating the inputs of the switching unit in an order of priority, and varying said order of priority over time, further the forwarding step comprising the step of
   forwarding, if signals are detected at the same point of time on more than one input, a signal which is detected on an input with a highest priority, to said output.

5. A method as claimed in claim 1, further comprising the step of
   forwarding signals which arrive at said output to an input of another switching unit, the method being repeated for said another switching unit.

6. A method as claimed in claim 1, wherein the informing step comprising the step of
   for each blocked signal, sending an error signal back to the transmission unit which sent the signal.

7. An apparatus for multiplexing data flows, comprising:
   at least two inputs;
   at least one output, the number of outputs being fewer than the number of inputs;
   means for detecting signals on said at least two inputs;
   means for forwarding signals, which are detected at a point of time when no other signal is forwarded to said at least one output from the apparatus, to said at least one output;
   means for blocking signals which are detected at a point of time when another signal is forwarded to said at least one output; and
   means for informing a transmission unit which sent a signal blocked by the blocking means that the signal has been blocked, wherein
   said signals are optical signals and said means for informing comprise means for reflecting the blocked signals back to the transmission units which sent the signals blocked by the blocking means.

8. An apparatus as claimed in claim 7, wherein said means for informing comprise
   means which send an error signal back to the transmission unit that sent the signal blocked by the blocking means.

9. An apparatus as claimed in claim 7, further comprising means to allocate the inputs of the apparatus in an order of priority and to vary said order of priority over time, and
   said forwarding means forwarding, if signals are detected at the same point of time on more than one input, a signal which is detected on an input with a highest priority, to said at least one output.

10. An apparatus as claimed in claim 7, further comprising
    means at said at least one output which are to forward signals to an input of another switching unit.

11. An apparatus for multiplexing data flows from a number of transmission units on a small number of output channels, comprising a number of switching units, each switching unit comprising:
    at least two inputs;
    at least one output, the number of outputs being smaller than the number of inputs;
    means for detecting signals on said at least two inputs;
    means for forwarding signals, which are detected at a point of time when no other signal is forwarded to said at least one output from the switching unit, to said at least one output;
    means for blocking signals which are detected at a point of time when another signal is forwarded to said at least one output;
    means for informing a transmission unit which sent a signal that the signal has been blocked; and
    means at said at least one output for forwarding signals to an input of another switching unit,
    wherein said signals are optical signals and said means for informing further comprise means for reflecting the blocked signals back to the transmission units which sent the signals blocked by the blocking means;
    said switching units of said apparatus being arranged in a tree structure in a number of levels where said at least one output from each of the switching units in one level is connected to an input of a switching unit in a subsequent level, the number of switching units in a higher level being greater than the number of switching units in a lower level.

12. An apparatus as claimed in claim 11, wherein the number of transmission unit is $2^n$, the number of output channels is 1, the number of switching units is $\Sigma_{k=0}^{n-1} 2^k$, the number of levels is n, wherein n and k are positive integer numbers, and the number of switching units in one level is twice the number of switching units in a subsequent level.

13. An apparatus as claimed in claim 12, wherein each transmission unit is adapted, in response to the information that a signal it has sent has been blocked, to interrupt the transmission of the blocked signal and to repeat the transmission of the blocked signal after a delay time.

14. An apparatus as claimed in claim 11, wherein each transmission unit is adapted, in response to the information that a signal it has sent has been blocked, to interrupt the transmission of the blocked signal and to repeat the transmission of the blocked signal after a delay time.

* * * * *